(12) United States Patent
Remelman (10) Patent No.: US 7,181,339 B2
(45) Date of Patent: Feb. 20, 2007

(54) REAL-TIME SPECTRAL ANALYSIS OF INTERNAL COMBUSTION ENGINE KNOCK

(75) Inventor: George Mark Remelman, Fremont, CA (US)

(73) Assignee: Spectral Dynamics, Inc., San Jose, CA (US)

( * ) Notice: Subject to any disclaimer, the term of this patent is extended or adjusted under 35 U.S.C. 154(b) by 0 days.

(21) Appl. No.: 11/362,692

(22) Filed: Feb. 27, 2006

(65) Prior Publication Data

US 2006/0206254 A1 Sep. 14, 2006

Related U.S. Application Data

(60) Provisional application No. 60/662,066, filed on Mar. 14, 2005.

(51) Int. Cl.
*G01L 23/22* (2006.01)
(52) U.S. Cl. .................................. 701/111; 123/406.27
(58) Field of Classification Search ................ 701/111, 701/114, 115, 102, 101; 123/406.15, 406.21, 123/406.27, 406.29, 406.34
See application file for complete search history.

(56) References Cited

U.S. PATENT DOCUMENTS 4,471,736 A * 9/1984 Yoshida et al. ........ 123/406.21
5,109,821 A * 5/1992 Yoshida et al. ........ 123/406.15
5,215,059 A * 6/1993 Kaneyasu ............... 123/406.27

OTHER PUBLICATIONS

Collins, "Engine Knock Analyzer" Raeburn Technology, 4 pp.
Daniels et al., "Inaudible Knock and Partial-Burn Detection Using In-Cylinder Ionization Signal" SAE Technical Paper Series, 2003-01-3149, Powertrain & Fluid Systems Conference & Exhibition, Pittsburg, PA Jan. 2003. 9 pp.
Hollowell et al., A Close Look at the Measurement of Shock Data—Lessons Learned—13$^{th}$ Aerospace Testing Seminar, IES Journal, 1992, 8 pp.
"Hitachi Accelerates the Development of Engine Knock-Reduction Systems" www.mathworks.com, User Story, Jan. 2005, 2 pp.
"Engine Knock Detection Using Spectral Analysis Techniques With a TMS320 DSP", Texas Instruments, Digital Signal Processing Products, 1995. 1 p., (Cover page only w/ internet link provided).

* cited by examiner

*Primary Examiner*—Hieu T. Vo
(74) *Attorney, Agent, or Firm*—Jon M. Dickinson, PC; Robert D. Varitz, PC (57) ABSTRACT

A system for, and a method of, obtaining, for analysis, from a subject internal combustion engine, real-time engine knock data involving assessing, as a positive indication of engine knock behavior, whether the energy-content value represented in at least one selected, knock-relevant frequency-domain spectral bin which is present in a frequency-domain energy-content spectrum derived from acquired engine operating data of a type expected to contain evidence of engine knock behavior exceeds that of a pre-selected energy threshold value.

24 Claims, 4 Drawing Sheets

REAL-TIME SPECTRAL ANALYSIS OF INTERNAL COMBUSTION ENGINE KNOCK

CROSS REFERENCE TO RELATED APPLICATION

This application claims priority to U.S. Provisional Patent Application Ser. No. 60/662,066, filed Mar. 14, 2005, for "Real-Time Spectral Analysis of Internal Combustion Engine Knock". The entire disclosure content of that prior-filed, currently co-pending provisional application is hereby incorporated herein by reference.

BACKGROUND AND SUMMARY OF THE INVENTION

The present invention relates to a system and a method for obtaining, for the purpose of analysis, real-time engine knock data derived from an operating, subject internal combustion engine. In particular, it relates to such a method and an associated system which advances the state of the art respecting capturing and assessing engine knock data in a manner which is both capable of acquiring and analyzing such data very rapidly, and which decidedly offers advanced precision identification and characterization of internal combustion engine knock.

Engine knock is a behavior wherein the normally controlled burn activity of an internal combustion engine is perturbed by premature ignition of the fuel/air mixture. There are many causes of knock, and it is very important to eliminate the possibility of excessive knock of any type so as to prevent serious damage to an engine, and loss of significant engine power and operating efficiency.

Despite advances heretofore in the science of addressing the issue of engine knock issue, the "gold standard" for real-time knock detection involves the bolting of a copper tube to the block of an engine for the purpose of permitting a trained technician to listen, via the tube, for audible sounds believed to be interpretable as knock. This very subjective and error-prone method is, of course, often quite unacceptable, and accordingly, there have been many efforts in recent years directed toward developing more sophisticated techniques for assessing internal combustion engine knock.

The present invention, recognizing that there have been many "science side" (rather then "art side") proposals and advancements for detecting and analyzing engine knock, nonetheless offers a significant and unique advance in the ability to accomplish precision, analyzable knock detection, and to do so very rapidly, very accurately, and on-the-fly, so-to-speak, during real-time engine operation. In a manner of thinking about the practice proposed by the present invention, that practice is based upon having access, effectively, to a body of engine-noise-reduced, frequency-domain-spectral, engine-operating, energy-content data derived from an operating engine—data of a kind which is expected to contain, in one or more selected, knock-related frequency bands (referred to herein as spectral bins), evidence of any engine-knock behavior. Such access leads, in accordance with practice of the invention, toward the step of comparing the sum total of noise-reduced spectral energy reflected in those selected spectral bins with a pre-determined spectral energy threshold value, with a positive declaration of the presence of engine knock behavior being made upon a determination that this spectral bin-sum total exceeds the mentioned threshold value.

Implementation of the methodology of the invention, as will be understood from the description which follows below, is practiced on a cycle-by-cycle basis over one, or any suitable plurality of engine operating cycles, with relevant data—typically cylinder-pressure data, being collected in real time, initially in the time domain, over an intentionally windowed range of engine crank angles.

Another way of expressing the unique practice of the present invention is to describe it as one involving determining, along the route of declaring there to be, or not to be, a positive indication of engine knock behavior, whether the sum-total energy-content value represented in at least one selected, knock-relevant spectral bin of the type just mentioned above, appropriately noise reduced, exceeds the value of the above-mentioned, predetermined spectral energy threshold.

These and other important features and advantages which are offered by the present invention will become more fully apparent as the below-following description of the invention which follows below is read in conjunction with the accompanying several drawings.

DESCRIPTION OF THE DRAWINGS

FIG. 11 is a frequency-domain spectral diagram, referred to herein as an energy-content spectral diagram, related to the information pictured in FIG. 10 for a collection (a plurality) of engine operating cycles, and specifically showing the energy levels of different spectral components contained in spectral data which has been transformed to the frequency domain from the originally acquired, time-domain, engine-operating data. This same spectral illustration of FIG. 11, which is specifically derived from a Fast-Fourier-transformed body of original, time-domain, analogue, engine-cylinder-pressure data, may also be "viewed" as representing a frequency-domain spectral diagram for Fast-Fourier-transformed, original, analogue, time-domain, acoustic data acquired simultaneously with the cylinder-pressure data which led to the waterfall display of FIG. 10.

FIG. 12 is a stylized, schematic diagram illustrating, for a single cycle of the type pictured in the frequency-domain spectrum of FIG. 11, the practice of the invention which involves bin-summing of spectral energy "contained" in two, pre-selected, spectral frequency bins which are specifically relatable to the likelihood of finding evidence of engine-knock behavior in such bins. FIG. 12, on its right side, also illustrates the practice of comparison, as will be explained below, of bin-summed energy content to a pre-determined energy threshold value which is used as a marker to define the boundary between confirmable engine-knock behavior and the absence of such behavior.

DETAILED DESCRIPTION OF THE INVENTION

Figure 1:
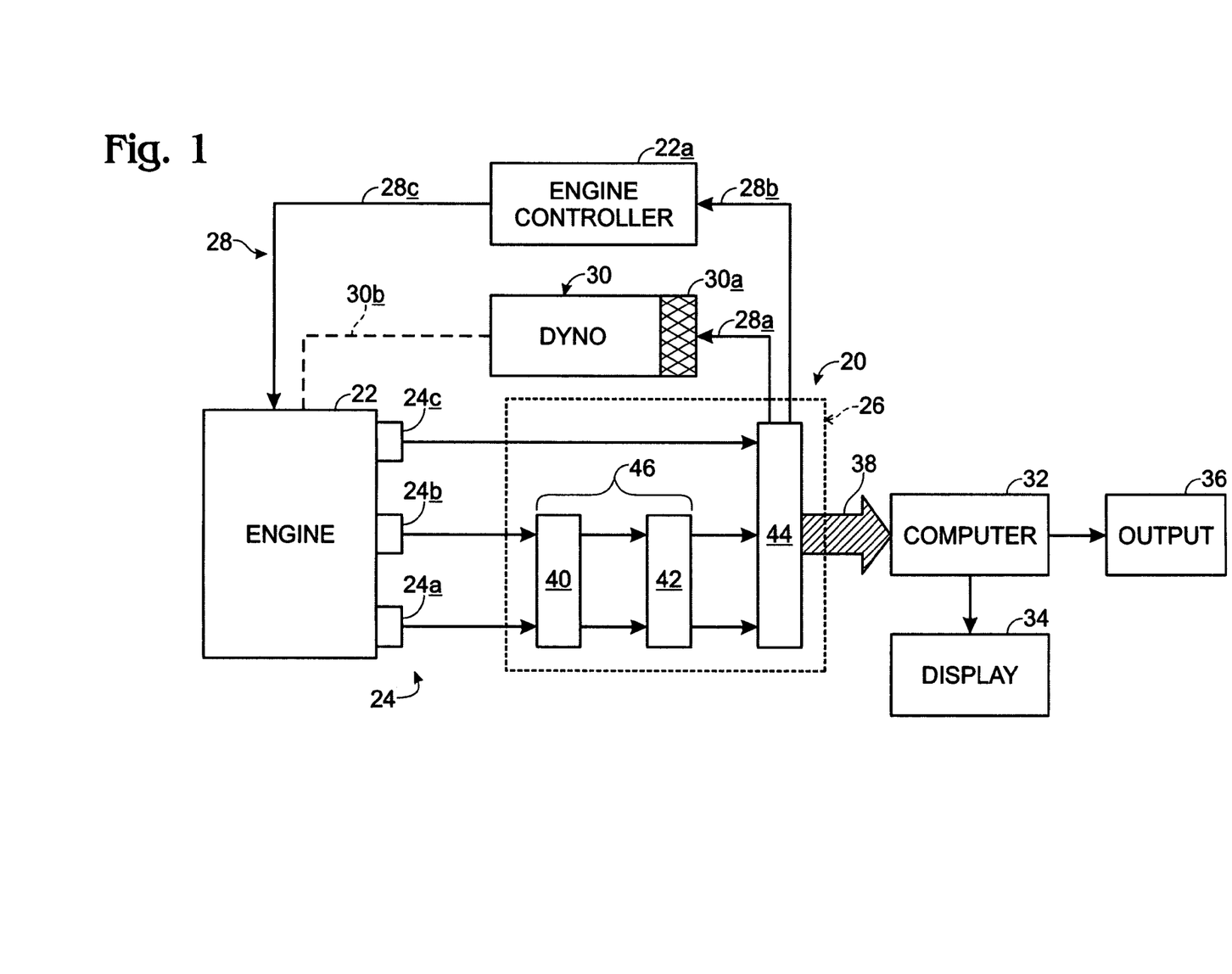
FIG. 1 is high-level, schematic illustration of a system designed to implement the unique methodology of the present invention. This illustration specifically relates to a practice of assessing the knock behavior of a subject engine under controlled circumstances where the engine is connected to an otherwise conventional dynamometer, typically at a point in the design history of that engine where its engineers are seeking to specify and effect any needed engine, or engine controller program, modifications in order thereafter to "release" an engine and controller for production which will not be subject to damaging, or otherwise unacceptable, knock behavior.

Turning now to the drawings, and referring first of all to FIG. 1, indicated generally at 20 is a real-time system for acquiring and presenting, for analytical use, from a subject internal combustion engine 22, engine-knock data. System 20 implements the practice and methodology of the present invention in one of its several forms.

Included in system 20, and appropriately operatively coupled to engine 22, which has an engine controller 22a, are (a) transducer structure 24, which includes at least one (for one cylinder) cylinder-pressure sensor 24a, an acoustic sensor 24b, and an engine crank-angle sensor 24c, (b) a portion 26 of signal-processing structure, and (c) what is referred to herein as operative interconnection structure 28. In FIG. 1, interconnection structure 28 includes a conventional dynamometer system (Dyno) 30 which has the usual signal-responsive, electronic controller 30a. Dyno 30 is mechanically coupled to engine 22 in a conventional manner via a connection shown in dashed lines at 30b.

Also seen in FIG. 1, and represented, respectively, by blocks 32, 34, 36, are a computer, which also forms part of the previously mentioned signal-processing structure, a display instrumentality, or display, such as a computer monitor, which is appropriately coupled to the computer, and output structure which provides appropriate, knock-information output data as a consequence of practice of the invention. Computer 32 is coupled to structure 26 through a conventional bus connection shown generally at 38.

Figure 3:
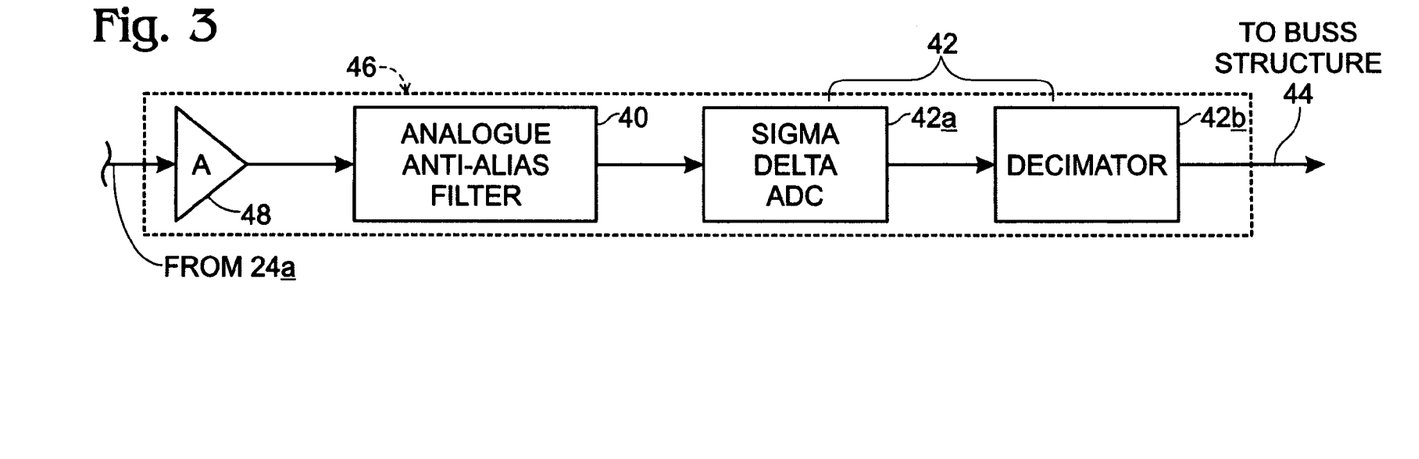
FIG. 3 is a fragmentary, block/schematic diagram illustrating generally analogue anti-aliasing, and subsequent digital Nyquist filtering, of direct-from-engine input data which is acquired in real time from an operating engine for the purpose of conducting the practice of the invention.

Making reference now to FIG. 3 in the drawings along with FIG. 1, included within structure 26, and represented therein by several blocks, are, respectively, an analogue, anti-alias filter structure 40, a combined, Sigma-Delta, analogue-to-digital converter structure (42a) and decimator structure (42b), collectively marked 42 (see the bracket in FIG. 3), and an output bus structure 44 (see FIG. 1). A bracket 46 shown in FIG. 1 helps to relate the bracketed structure in this figure to what appears in dashed-line block 46 in FIG. 3. As can be seen in FIG. 3, the content embraced by bracket 46 in FIG. 1 includes an analog input amplifier 48 which is connected in a cascade fashion with just-mentioned filter structure 40, Sigma-Delta structure 42a and decimator structure 42b.

It should be understood that what is shown in FIG. 3 relates, in operation and performance, specifically to signal-processing flow through structure 26 from cylinder-pressure sensor 24a to bus structure 44. Substantially the same cascade circuitry exists in and through structure 26 between acoustic sensor 24b and bus structure 44. For all practical purposes with respect to the present invention, angle-reference signals (pulses) acquired via crank-angle sensor 24c flow through structure 26 rather directly to bus structure 44.

A conventional control-signal output made available by and from bus structure 44 supplies control signals through a signal-coupling path 28a in interconnection structure 28 directly to dynamometer controller 30a. Another control-signal output from bus structure 44 is connected by a connection 28b to engine controller 22a. The usual operative connection between engine controller 22a and engine 22 is shown at 28c.

Figure 2:
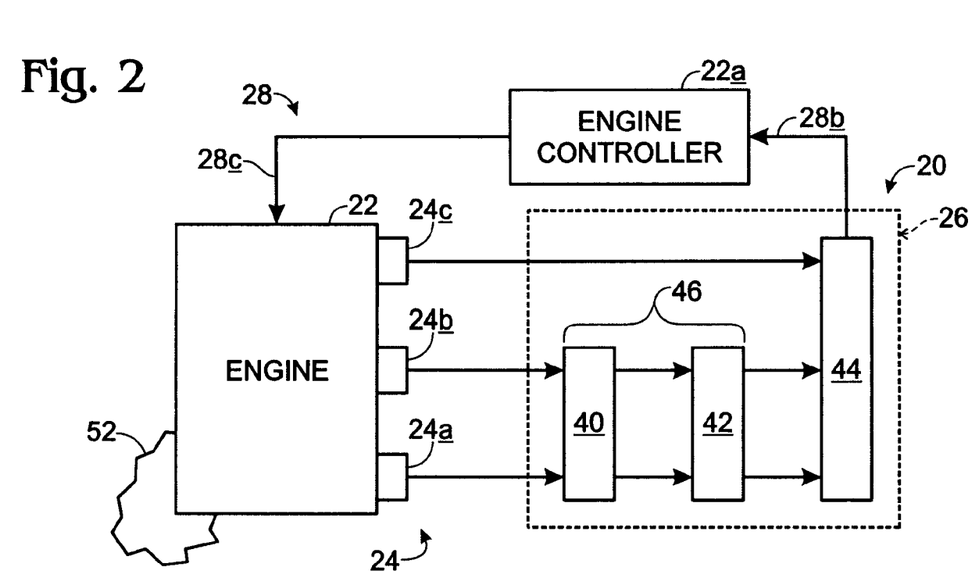
FIG. 2 is a high-level, block/schematic diagram illustrating a modified form of a system which practices the methodology of the present invention in the setting of an already-constructed vehicle, wherein detection of knock behavior can be employed, via a conventional, electronic engine controller, to make engine operating adjustments on-the-fly if engine knock behavior begins to show itself.

Before continuing with more description relating to FIGS. 1 and 3, and directing attention for a moment to FIG. 2, here, engine 22 is shown, schematically, installed in a vehicle which is pictured only fragmentarily at 52. The relevant control output of bus structure 44 is, as in FIG. 1, connected to engine controller 22a via previously mentioned connection 28b. In the invention embodiment illustrated in FIG. 2, it is expected that engine controller 22a will have the appropriate structure to perform the functions carried out in the embodiment shown in FIG. 1 by computer 32. If, however, this turns out not to be the case, an appropriate computer structure may be inserted in the control path existing between bus structure 44 and engine controller 22a. The insertion of such computer structure is something which will be well understood by those generally skilled in the relevant art, and accordingly is not further discussed herein.

While various different kinds of readily available signal-processing and handling structures may be employed to make up the contents of structure 26 herein, one arrangement which has been found to work extremely satisfactorily takes the form of a combination of a multi-channel data-acquisition module made by Spectral Dynamics in San Jose Calif., sold as VXI model VX2924, and any appropriate data output bus which makes up previously mentioned bus structure 44. Signals coming from crank-angle sensor 24c, which may take the form of a conventional rotary encoder capable of producing both index and clock pulses, are suitably coupled to an available digital input provided in structure 26 (and in VXI model VX2924). Analog signals arriving from cylinder-pressure sensor 24a, and from acoustic sensor 24b, are fed into structure 26 through appropriate analog inputs, following which, such signals are carefully analogue anti-alias filtered (block 40), Sigma-Delta analog-to-digital converted (block 42a), and decimated (block 42b) before flowing to bus structure 44. The combined performances of the two substructures (42a, 42b) which make up block 42 collectively implement digitizing and Nyquist filtering of the received, anti-alias-filtered signals. Nyquist filtering is preferably performed at a sampling rate which is no less than about 125-kHz.

With respect to sensors 24*a*, 24*b*, these are preferably entirely conventional devices which produce analogue signals respectively associated with the events which they are intended to monitor. Different types of cylinder-pressure sensors may be employed, such as a head-pressure sensor, and a spark-plug sensor.

It should further be understood that practice of the present invention, while now being described in conjunction with cylinder-pressure signals collected from a single engine cylinder, is preferably performed with cylinder-pressure sensing taking place for all engine cylinders. Such plural-cylinder pressure-sensing is readily accommodated by an appropriate, plural-channel device disposed at the location of structure 26. The VXI device model mentioned above is entirely suitable for this purpose.

For knock assessment purposes, while engine-operating acoustic data is quite useful for additional, knock-presence "confirmation" reasons, knock data having the greatest relevance, in relation to companion crank-angle data, will most likely appear in the cylinder-pressure data acquired from an operating engine. Accordingly, the following invention-practice description is given in terms of the acquisition and processing of such pressure data.

In general terms, practice of the present invention begins, during a period of engine operation, with the acquisition of engine operating data which will be suitable to "describe" expected engine operational noise (noise-reduction data) which is not to be confused with evidence of engine knock behavior. To do this, and following a particular engine operating practice which is well known to those skilled in the art, engine 22 is operated in a mode wherein it is consciously prevented from engaging in knock behavior, and at one or more specific rotational speeds, or through swept ranges of operational speeds, for the purpose of acquiring data from sensors 24*a*, 24*b*, 24*c* to be processed by the structure of this invention for the purpose of making available what is referred to herein as a baseline, noise-reduced body of energy-content, frequency-domain spectral data. More in detail will be said about such data very shortly. Gathering of this non-knock-condition data to create the mentioned noise-reduction data fundamentally employs much of the same signal processing and handling which is thereafter performed during engine testing to detect knock behavior. Thus, computer 32 operates during this noise-reduction, data-gathering time in essentially the same manner that it does when later engine testing is underway. Output is created by block 36, and one or more different types of displays—preferably waterfall-type displays—may be created in display instrumentality 34 by computer 32 for user viewing.

Before engaging shortly with a more detailed description of practice of the invention, it is important to note several things. First of all, engineers (or others) who are familiar with a particular engine, such as engine 22, will, by familiarity with the historical development of that engine, have a good understanding, in relation to various engine-operation rotational speeds, of the specific range of crank angles wherein engine knock behavior is most likely to occur. These same people will also have a relatively good preliminary idea about the frequency ranges (the previously mentioned frequency bins—fundamental, harmonic, etc.), wherein frequency-domain, spectral, engine operating data may contain evidence of engine knock behavior.

Practice of the present invention takes these important considerations into account by focusing the gathering of data at one or more specific engine-operating speeds, and in a kind of "windowed" fashion with respect to engine crank angle. This practice also contemplates certain pre-knowledge about the specific frequency-domain spectral frequency bands (bins) wherein, as was mentioned above, undesirable engine knock behavior is likely to be indicated. A further matter to note is that the category of cylinder-pressure-related spectral frequency-domain data which is acquired, created and employed in accordance with practice of the invention can be thought of as reflecting, or representing, spectral energy values. Accordingly, steps in the practice of the invention now to be detailed speak in terms of spectral energy values. Those skilled in the art will fully understand the logic and sense of viewing the practice of the present invention in this manner.

Figure 4:
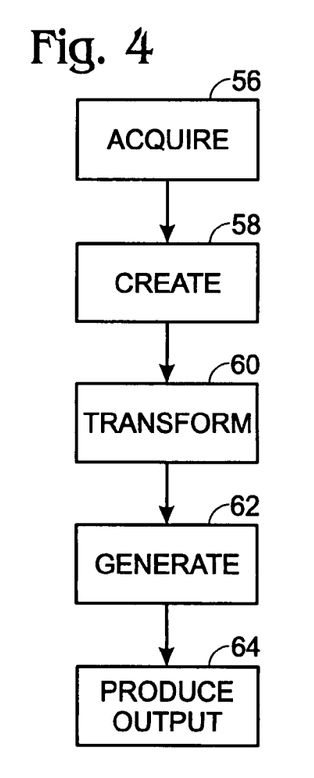
FIG. 4 is a high-level, block/schematic diagram illustrating, from one point of view, one way of expressing, methodologically, the overall practice of the present invention.

Focusing attention now generally on the remaining drawing figures before engaging in a detailed description of practice of the invention, FIG. 4 illustrates, in five blocks, 56, 58, 60, 62, 64, an overall view of one manner of practicing the invention. These blocks are labeled, respectively, ACQUIRE, CREATE, TRANSFORM, GENERATE and PRODUCE OUTPUT. The fuller meanings of these shortened labels for these blocks will be explained shortly.

Figure 5:
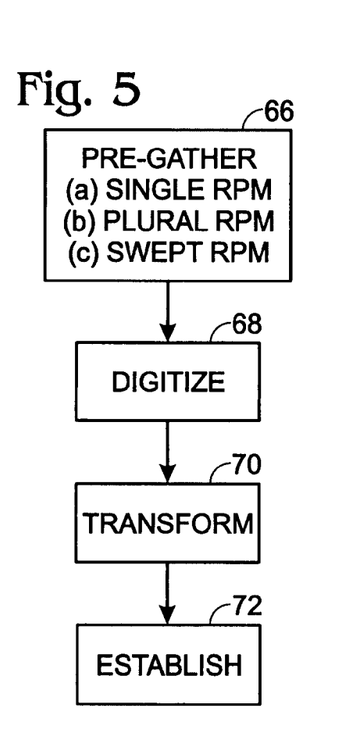
FIG. 5 is a high-level, block/schematic diagram describing the creation of baseline, noise-reduction data which is employed, in accordance with the invention, to minimize the likelihood that spurious noise events might become confused with, and characterized as, true engine knock behavior.

FIG. 5 illustrates, in four blocks, 66, 68, 70, 72, which are generally labeled PRE-GATHER, DIGITIZE, TRANSFORM and ESTABLISH, that portion of practice of the present invention which involves establishing what is referred to herein as a baseline body of frequency-domain spectral data which is employed to create the above-referred-to noise-reduced body of frequency-domain spectral data.

Figure 6:
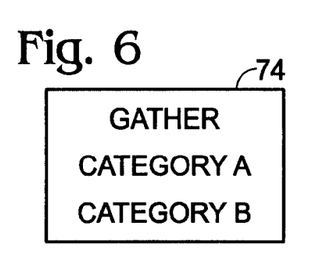
FIG. 6 is a diagram block illustrating, very generally, the gathering of two particular categories of knock-relevant data from an operating engine.

FIG. 6 illustrates, in a single block 74, specifically what is performed in terms of data-gathering illustrated in FIG. 4 by block 56. Analogue data coming in from sensors 24*a*, 24*b* is referred to herein as Category A data. Pulse, crank-angle data arriving from sensor 24*c* is referred to as Category B data.

Figure 7:
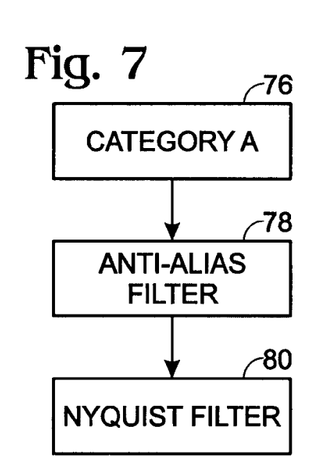
FIG. 7 is a high-level, block/architectural illustration specifically of anti-aliasing and Nyquist filtering of one of the two categories of data identified in FIG. 6.

FIG. 7, employing three blocks, 76, 78, 80, labeled, respectively, CATEGORY A, ANTI-ALIAS FILTER and NYQUIST FILTER, illustrates practice of the invention involving high-level anti-aliasing and Nyquist filtering, en route to bus structure 44, of originally incoming analog (Category A) data arriving at structure 26 from sensors 24*a*, 24*b*.

Figure 8:
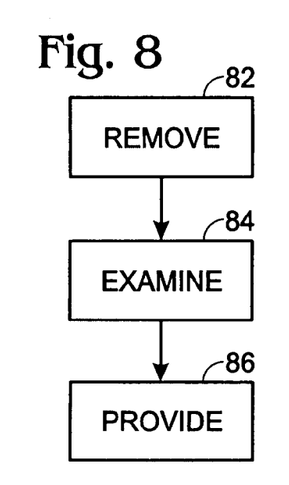
FIG. 8 is a high-level block diagram illustrating the invention practice of removing baseline noise artifacts from a body of engine operating data in order to furnish what is referred to herein as a noise-reduced body of energy-content, frequency-domain spectral data.

In FIG. 8, three blocks, 82, 84, 86, labeled, respectively, REMOVE, EXAMINE and PROVIDE, generally describe steps which are performed by block 64 in FIG. 4.

Figure 9:
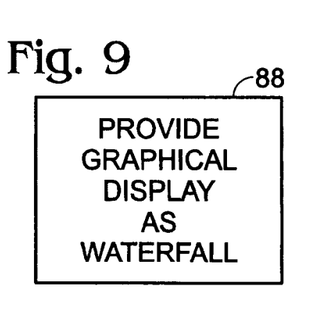
FIG. 9 is a very simple, high-level, diagram block illustrating the creation and provision of a waterfall-type visual display (or plural displays, if desired), useful to someone practicing the present invention.
Figure 10:
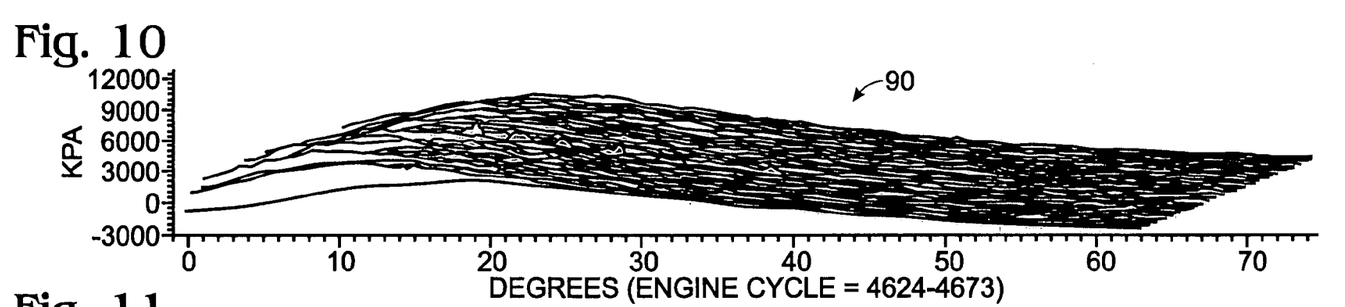
FIG. 10 is a waterfall-type display representing a selected collection of successive engine operating cycles picturing, for a single cylinder in an engine being examined, cylinder pressure over a pre-selected, windowed range of engine crank angles.
Figure 11:
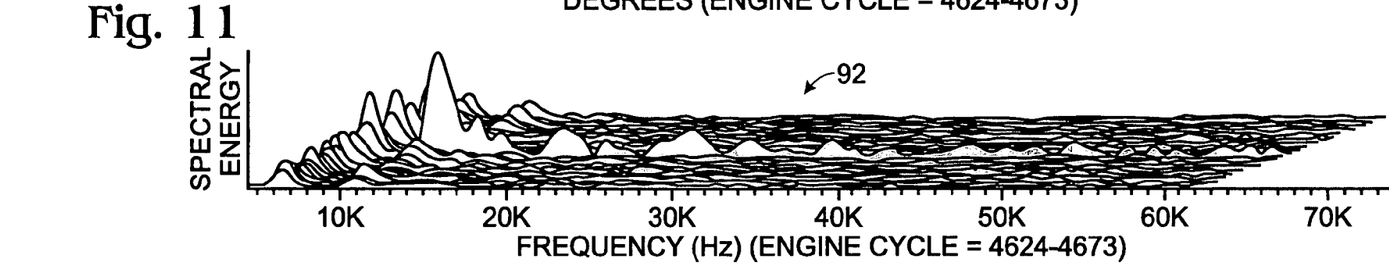

In FIG. 9, a single block 88 represents practice of the present invention involving the providing of a graphical display, preferably in the form of one or more waterfall-type displays, such as the two displays shown at 90, 92 in FIGS. 10 and 11, respectively.

With reference now more specifically to what is shown in FIGS. 4–9, inclusive, before conducting a specific engine test for knock, certain preliminary steps are taken. In particular, certain preliminary decisions are made respecting how an engine, such as engine 22, will be operated, and how data will be collected ultimately to reveal knock. The "operator" will typically choose one or more specific engine operating speeds at which to collect data, or may, if desired, choose, either as an alternative to that, or in addition to that, a range of operating speeds through which an engine will be swept from one end to the other during testing. Additionally, the operator will select a particular "window" which defines a range of engine crank angles wherein any engine knock behavior is likely to be found, and will further, from experience and knowledge, choose one or more specific spectral frequency ranges (the above-mentioned spectral bins) wherein, with respect to frequency-domain spectral data which has been transformed from acquired engine-operating analog data, the particular engine, such as engine 22, is expected, if at all, to exhibit knock behavior.

A first task, or step, essentially, is to establish (block 72, FIG. 5), relative to a pre-chosen range of engine crank angles, a baseline body of normal, engine noise data (ultimately, a baseline body of spectral data) which will be removed (block 82, FIG. 8) from later-acquired test data (block 56, FIG. 4) in order to prevent expectable engine noise data from creating a false artifact which could be interpreted incorrectly as an indication of a knock condition.

Giving now an illustration of the establishment of such baseline data, and assuming (a) that a particular, single operating speed is chosen for the preparation and testing of engine 22, and (b), that an appropriate crank-angle window, or range, has been selected, the engine is operated at the chosen speed under conditions wherein it will not exhibit any knock behavior. Additionally, the operator will choose, preliminarily, a certain number of engine cycles with respect to which baseline data is to be developed, and a typical range for such a range might be from about fifty cycles to about one thousand. The data presented in the waterfall display of FIG. 10, it will be assumed herein for current illustration purposes, reflects early results of this action of preliminary, baseline data collecting, or what is called herein a step of pre-gathering (block 66, FIG. 5), with such being done (a) over about fifty or so engine cycles, (b) at the chosen engine operating speed, and (c) within a selected crank-angle window spanning angles from about 0-degrees to about 62-degrees.

With the engine so operating, engine-operating data, referred to herein as a baseline body of analogue data (Category A data), is pre-gathered, collected and observed (block 66, FIG. 5) in accordance with practice of the present invention, with that data being supplied by sensors 24a and 24b to the signal-processing structure included in block 26. Crank-angle reference data from sensor 24c is also simultaneously collected. Analogue data (block 76, FIG. 7) arriving in block 26 from sensors 24a, 24b is first anti-alias filtered (block 78, FIG. 7), and then sampled and Nyquist filtered (block 68, FIG. 5, and block 80, FIG. 7) to yield what is called herein a baseline body of digital data, which is then sent through bus structure 44 to computer 32. Respecting this digital data, computer 32 performs a Fast-Fourier transform (block 70, FIG. 5) to establish (block 72, FIG. 5), for each of the selected total number of "observed" operating cycles, and for the pre-selected crank angle window, a time-domain to frequency-domain transformed baseline body of spectral data.

Focusing principally on the acquisition and signal processing of engine cylinder-pressure data, a per-cycle, over plural-cycles, waterfall plot of cylinder pressure vs. crank angle may be presented for an operator to view, and such a plot is pictured at 90 in FIG. 10, wherein engine cylinder pressure (for a single engine cylinder) is plotted over and throughout the selected window of crank angles mentioned above. Similarly, the viewer is also presented preferably with a waterfall plot like plot 92 in FIG. 11 showing, again on a per-cycle basis, for plural cycles, and throughout the selected crank-angle window, cylinder-pressure, frequency-domain, spectral energy vs. crank angle. A similar waterfall plot may also be provided for viewing related frequency-domain spectral engine acoustic (from sensor 24b) energy vs. crank angle. To visualize such a plot, plot 92 may, for this purpose, be thought of as illustrating such an additional, useful kind of waterfall display.

With the plural-cycle spectral plot of FIG. 11 in mind as an assist in visualizing and understanding certain steps of the present invention, for each frequency spectral representation of each engine cycle so observed during the "baseline" process, and with respect to the specific frequency range (or ranges), or spectral bin (or bins), wherein knock behavior of engine 22 is expected to be evident during a regular engine run (i.e., a test run), an important summation is performed to calculate the sum-total area (the energy) under the frequency-domain curve (a single-cycle spectral plot, or spectrum, within the crank-angle window) which extends through each of the selected spectral bins. For simplicity, the balance of the invention-practice description herein will proceed with the assumption that there are plural, and specifically two, spectral bins which are of interest.

This summing process produces a particular, "engine-noise", spectral-energy, index number which is relevant to each engine cycle. Thereafter, (a) all of the selected, spectral-bin, per-cycle energy-summation totals are added, (b) that total of sums is divided by the number of cycles from which data was employed to produce the mentioned summation, and (c) the result of this division is then treated as a baseline noise, spectral-energy index value which will be employed during a subsequent knock-detection test of engine 22 to remove/reduce noise contribution which could lead to the presence of false indications of engine knock behavior.

Figure 12:
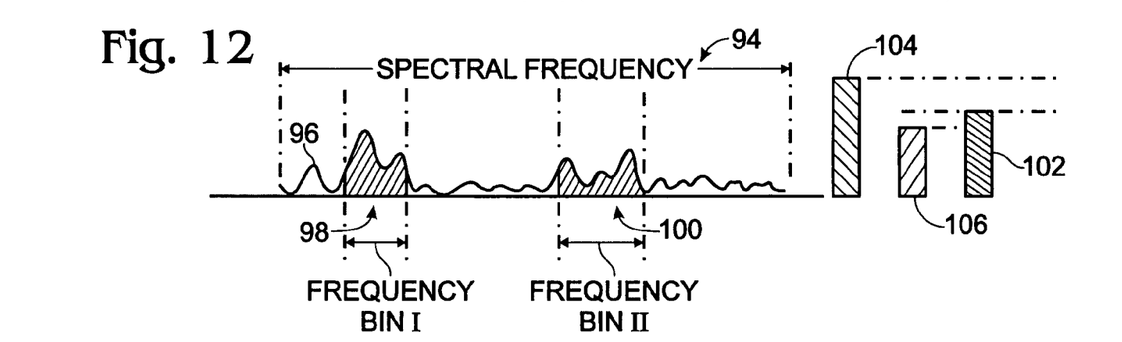

The left side of FIG. 12 generally pictures a part of this just-described process. In this figure, the frequency-domain spectrum, or curve, 94 of one of the cycles (curve 96) of FIG. 11 has been isolated for illustration purposes. This spectrum "covers" the full range of the pre-chosen crank-angle data window. Two spectral bins, 98, 100 are illustrated in FIG. 12, and the areas (representing energy) under curve 96 within these bins have been shaded. These are the spectral bin individual areas (energies) which are summed for each spectrum of each cycle shown in FIG. 11, as outlined above.

On the right side of FIG. 12, the height of a shaded block 102 represents the above-mentioned baseline noise index value which is the value that will be used for noise-reduction purposes during a coming engine knock test. More will be said about FIG. 12 shortly.

If such baseline noise-removal data is intended to be collected for several, different, specific, engine operating speeds, the "noise-index-value" process just described is repeated for each such speed. For each of these speeds, what will result will be a baseline, noise-reduction, spectral-energy, index value which is specifically relevant to that speed.

If, with respect to another manner of practicing the present invention, engine knock testing is intended to be performed under a circumstance where the operating speed of the engine is to sweep from one speed to another, the practice just above described is performed so as to create a baseline noise-reduction curve which is relevant to that sweep of engine speeds. From the descriptive information just given above, the matter of how to create such a curve will be readily evident to those skilled in the art.

For the purpose of continuing now and completing a description of one manner of practicing the present invention, let us assume that we are dealing strictly with a single engine speed, and thus a single, baseline noise-reduction, spectral-energy index value.

With such baseline noise-reduction information acquired and available, and from knowledge and skill in the relevant art, the operator will choose another energy-related number, or value, which is greater than the baseline noise index value that has been determined as above explained. This selected other number, chosen out of expected operator experience and knowledge, will be treated as a threshold against which later-acquired test data will be measured in order to make a declaration about whether or not engine knock is taking place.

Full testing of engine 22 begins with the engine now operated without the anti-knock constraints mentioned earlier, and at the selected operating speed. Analogue time-domain, real-time data is collected by sensors 24a, 24b, and a body of engine crank-angle reference data is gathered from sensor 24c (block 56, FIG. 4, and block 74, FIG. 6).

Focusing attention now principally on the collection of test data relative to engine cylinder pressure, such data being acquired by sensor 24a, and being also referred to herein, along with data collected by sensor 24b, as a first body of analogue data, this data, in block 26, is anti-alias filtered (block 78, FIG. 7), and sampled and Nyquist filtered (block 80, FIG. 7), preferably at the earlier-mentioned "no less than" sampling rate of about 125-kHz, to create (block 58, FIG. 4) what is called herein a first body of digital data. The thus created first body of digital data is next supplied to computer 32 which is, effectively, instructed to gather such digitized time-domain engine cylinder-pressure information only over the pre-decided window of engine cycles, and is also instructed, for subsequent analysis purposes, to pay attention effectively only to information which sits within the previously mentioned, pre-chosen spectral bins. Computer 32 performs a Fast-Fourier transform (block 60, FIG. 4) of this first body of digital data to generate (block 62, FIG. 4) a first body of frequency-domain spectral data, such as that which is pictured in plot 92 in FIG. 11.

It should be mentioned, and attention is directed here specifically to FIG. 1, that the plots of data shown in FIGS. 10 and 11 are supplied to display instrumentality 34 (block 88, FIG. 9) in a manner whereby an entire per-cycle run of data is made visibly available to the operator, without, in relation to FIG. 11, any isolation yet taking place regarding the selected spectral bins. Computer 32, however, goes on to process this transformed data, on a cycle-by-cycle basis, to apply, but only in and with respect to the previously mentioned spectral bins, a subtraction from sum totaling of the energy information in those bins, of the previously prepared baseline noise index value. What results from this, for each cycle with respect to which data of interest has been collected, is a numeric value which represents the bin sum of spectral energy present in that cycle, reduced by the previously determined noise-reduction baseline value. The remainder, for each cycle, is a number, or value, which is reflective, potentially, of any knock behavior which may have been detected (see again FIG. 12).

For each such remainder number, calculated for each of the relevant engine cycles, this number is then compared to what was described above as a threshold value, and a calculated bin-sum number for any individual cycle which exceeds this threshold is declared to be indicative of engine knock behavior.

This performance on spectral frequency-domain data which has just been described is illustrated in FIG. 12 in the drawings, as was mentioned briefly above, where a spectral frequency range is shown generally at 94 for a single engine-cycle spectrum 96 containing pre-selected spectral bins 98, 100. In this illustration, the spectral energy content which is contained in those two bins is summed to create a preliminary bin-sum number with respect to which the engine noise reduction value is applied to remove unwanted noise-created data. If one assumes for a moment that what is pictured in the spectral frequency curve (96) shown in FIG. 12 has already been noise reduced ((block 82, FIG. 8), what is now left to do, in accordance with practice of the present invention, is to calculate whether or not the noise-reduced spectral bin sum for curve 96, drawn from the two spectral bins illustrated, produces a number, or value, which is greater than or less than the previously established threshold value.

On the right side of FIG. 12, such a comparison is illustrated, with the threshold valuer being represented at 102 by the height of this block. Blocks 104, 106, in relation to block 102, illustrate two different kinds of comparative results. Block 104 represents a bin-sum calculation, as just described, which has produced a sum number which is greater than threshold 102. Block 106 illustrates a condition where the same bin-sum total produces a number which is less than threshold 102. Accordingly, if the comparison with the threshold just mentioned produces a number (value) such as the block-104 number, an engine knock event is determined to have been found. If, on the other hand, the comparison is like that between blocks 102 and 106, no engine-knock declaration is made.

Before going on with a description of the operation of this invention, the system and methodology of the invention may be practiced in such a manner, during operation of engine 22 in a test phase, whereby the actual collection of data respecting which a knock-condition "announcement" will be made, is done only after "preliminary data" indicates the probability that a knock event has occurred. In other words, the system and methodology of this invention may be practiced in a data-collecting and analysis "confidence-building" mode wherein it is required that a certain number of engine operating cycles (one or more) in succession must show evidence of an engine knock condition before confident data gathering takes place.

Assuming that such confidence-building practice has taken place, and data is collected, this data is collected over the previously mentioned predetermined number of engine operating cycles, and the bin-sum practice described above is conducted individually for the spectrum generated for each of these cycles. When a condition exists where any given cycle produces an indication of engine knock behavior, the system effectively produces an output, as indicated in FIG. 1 by block 36, and in FIG. 4 by block 64, wherein knock confirmation is made, and any further analysis of engine knock behavior may be carried out.

During a test of an engine, such as engine 22 as illustrated in FIG. 1, feedback control information for the engine is provided through engine controller 22a and dynamometer 30 and its controller 30a, as illustrated at the top of FIG. 1. This feedback control information is used to adjust the operation of engine 22 so as at least to minimize, if not completely eliminate, knock behavior. The natures of such adjustments are well known by those skilled in the art. The same general sort of feedback information, as illustrated in FIG. 2, may be employed in a vehicle-installed engine to apply engine control through the engine controller to implement "on-the-fly" adjustment of the operation of the vehicle engine so as to reduce or eliminate knock.

With this description now given, one can see that what is pictured in FIG. 5 illustrates graphically the process of gathering and creating baseline noise-reduction data. FIG. 4 illustrates the overall steps of the invention involved in performing the engine knock test procedure set forth above. FIG. 6 illustrates the gathering or acquiring from an engine of two categories of data, referred to herein as Category A data and as Category B data. FIG. 7, in blocks 76, 78, 80, illustrates the practice of anti-alias filtering, followed by Nyquist filtering, of the initially acquired, analogue, Category A-type data. FIG. 8 illustrates the operation of block 64 in FIG. 4 with respect (a) to the removing of noise data, (b) to the subsequent examining of noise-reduced spectral frequency domain data, and (c) to the ultimate providing, as via block 36, of appropriate knock-related output information. Block 88, of course, represents the provision of graphical waveform waterfall imagery to be presented by display instrumentality 34.

While, therefore, a detailed description of implementation of the methodology of this invention has just been provided specifically with respect to a single, selected operating speed, it will be understood that the same practice may be implemented at a plurality of different specific engine operating speeds if so desired. The methodology of the invention may also be implemented under circumstances where knock behavior is to be assessed in the context of a sweep, from one speed to another, of engine operating speeds.

Thus a novel methodology, and a system for implementing it, have been described for acquiring, for analysis purposes, reliably and quickly obtained real-time engine knock information through a practice which involves comparing the above-noise-level, bin-sum values in a spectral frequency domain plot of engine operating behavior to a predetermined threshold index number, as a way of improving, significantly, the state of the art with respect to the confident gathering of engine knock data for analysis purposes.

Accordingly, while the invention has been described in particular manners and in particular settings hereinabove, it is appreciated that variations from what has been discussed above may be made in the implementation of the invention, which variations will come within the scope of the following claims.

I claim:

1. A real-time system for acquiring and presenting, for analytical use, from a subject internal combustion engine, engine-knock data, said system, in operative condition, comprising
    transducer structure operatively coupled to such an engine, operable, when so coupled, and with the engine operating, to acquire (a) subject-engine-derived, energy-content operating data expected to include subject-engine knock energy data when an engine-knock condition exists in the subject engine, and (b) subject-engine crank-angle data and
    signal-processing structure operatively connected to said transducer structure for receiving such subject-engine-derived operating data and subject-engine crank-angle data, and operable, when engine-knock data is present in the received subject-engine-derived operating data, and based upon an energy-content, energy-thresholding determination practice, to produce and present an output which focusedly identifies subject-engine knock behavior.

2. The system of claim 1, wherein said transducer structure includes an engine-cylinder pressure sensor.

3. The system of claim 1, wherein said transducer structure includes an engine-coupleable acoustic sensor.

4. The system of claim 1, wherein said transducer structure includes (a) an engine-cylinder pressure sensor, (b) an engine acoustic sensor, and (c) an engine crank-angle sensor.

5. The system of claim 4 which further comprises structure operatively interconnecting said signal-processing structure and the subject internal combustion engine for supplying control information designed for improving the anti-knock operation of the subject engine.

6. A method of obtaining, for analysis, from a subject internal combustion engine, real-time engine knock data comprising
    acquiring simultaneously from a subject engine, during engine operation, and over a selected window of crank angles, (a) a first body of real-time, time-domain, engine-operating, energy-content analogue data of a character wherein engine-knock information will effectively be present as content if an engine-knock condition then exists, and (b) a reference body of related crank-angle data,
    creating from the acquired first body of analogue data an associated, and appropriately anti-aliased and sampled, first body of time-domain, energy-content digital data,
    Fast-Fourier-transforming the created first body of digital data from the time domain to the frequency domain to generate a first body of energy-content frequency-domain spectral data which relates specifically to the windowed crank-angle data, and which includes at least one selected, knock-relevant spectral bins, and
    utilizing collaboratively (a) the spectral bin(s) in the first body of spectral data, and (b) the windowed reference body of crank-angle data, producing an output which focusedly identifies subject-engine knock behavior through the implementation of steps including examining the energy content which is reflected in the selected spectral bin(s).

7. The method of claim 6 which further comprises (a) pre-gathering, from the same operating subject engine, under controlled, non-engine-knock conditions, and over the mentioned, windowed crank angles, a baseline body of real-time, time-domain, energy-content analogue data generally having the same character as that of the mentioned first body of analogue data, (b) digitizing the baseline body of analogue data to yield a baseline body of energy-content digital data, and (c) Fast-Fourier-transforming the baseline body of digital data from the time-domain to the frequency domain to establish a baseline body of energy-content, frequency-domain spectral data which relates specifically to the selected crank-angle window, and wherein said producing includes removing the baseline body of spectral data from the first body of spectral data, thus to make available a noise-reduced body of energy-content, frequency-domain spectral data.

8. The method of claim 7, wherein said producing further includes, following said removing step, (a) examining the summed energy content evidenced by the spectral bin(s) in the noise-reduced body of spectral data in relation to a predetermined threshold energy value, and (b) using the results of said examining, in relation to information contained in the reference body of crank-angle data, to provide the mentioned output of focusedly identified engine-knock behavior.

9. The method of claim 7, wherein said acquiring of subject-engine, engine-operating data includes gathering, as Category A data, at least one of (1) analogue, subject-engine, engine-cylinder-internal, cylinder-pressure data and (2) analogue subject-engine, engine-acoustic data, along with, as Category B data, the mentioned subject-engine crank-angle data.

10. The method of claim 9 which further includes anti-alias filtering of the gathered Category A data.

11. The method of claim 10 which further includes Nyquist filtering the anti-alias-filtered Category A data.

12. The method of claim 11, wherein said Nyquist filtering is performed at a sampling rate which is no less than about 125-kHz.

13. The method of claim 6 which further includes utilizing the mentioned output of focusedly identified subject-engine knock behavior to improve the anti-knock operation of the subject engine.

14. The method of claim 6, wherein the generated first body of spectral data includes data related to cylinder-pressure data, and which further comprises producing a graphical display based upon the cylinder-pressure data included in the first body of spectral data.

15. The method of claim 14, wherein said producing of a graphical display includes creating a waterfall-type visual display relating subject-engine cylinder-pressure data to subject-engine crank-angle data.

16. The method of claim 15, wherein said acquiring is accomplished over a selected number of subject-engine operating cycles, and said creating is performed in such a manner that the created waterfall-type visual display contains information relative to a selected plurality of successive, subject-engine operating cycles.

17. The method of claim 6 which is carried out, selectively, for one, or for a selected plurality of, subject-engine operating RPM speed(s).

18. The method of claim 17, wherein said removing step is performed utilizing, for each selected subject-engine operating RPM speed, a speed-specific body of baseline subject-engine-noise data.

19. The method of claim 6 which is carried out over selected swept range of subject-engine operating RPM speeds.

20. A method of obtaining, for analysis, from a subject internal combustion engine, real-time engine knock data comprising
assessing, as a positive indication of engine knock behavior, whether the energy-content value represented in at least one selected, knock-relevant spectral bin which is present in a frequency-domain energy-content spectrum derived from acquired engine operating data of a type expected to contain evidence of engine knock behavior exceeds that of a pre-selected energy threshold value.

21. A method of obtaining, for analysis, from a subject internal combustion engine, real-time engine knock data comprising
based upon having access to engine-noise-reduced, frequency-domain-spectral engine-operating energy-content data of a kind expected to contain, in one or more selected, knock-related spectral bins, evidence of any engine-knock behavior, comparing the sum total of spectral energy reflected in those spectral bins with a pre-determined spectral energy threshold, and declaring the presence of engine knock behavior if this sum total exceeds the threshold.

22. The practice of claim 21 which is conducted on a cycle-by-cycle basis over a pre-selected number of engine operating cycles.

23. The practice of claim 21 which is conducted for a windowed range of engine crank angles.

24. The practice of claim 21 which is conducted (a) on a cycle-by-cycle basis over a pre-determined number of engine operating cycles, and (b), for a windowed range of engine-crank angles.

* * * * *